Oct. 26, 1937.  M. FELIX  2,096,849
APPARATUS FOR PREPARING INFUSIONS
Filed Feb. 4, 1937   2 Sheets—Sheet 1
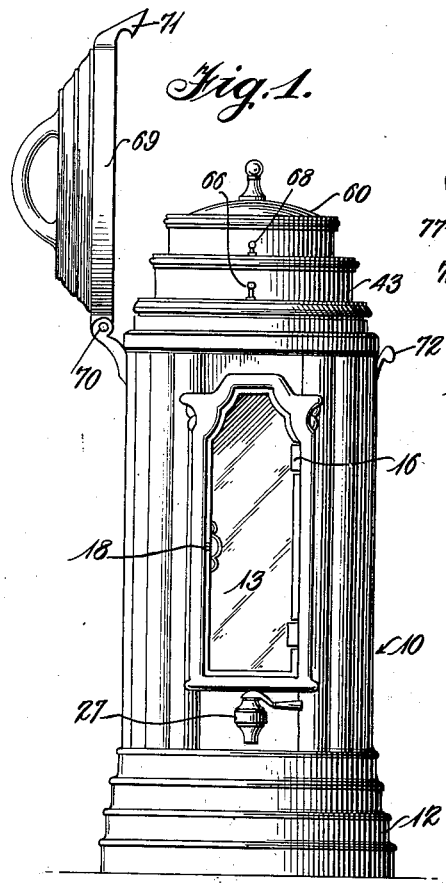
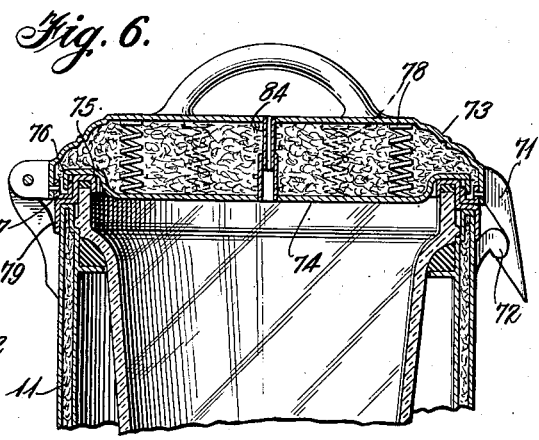
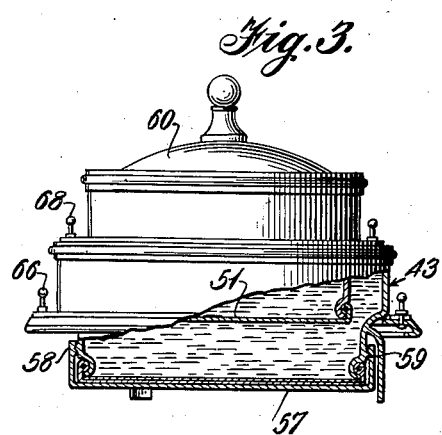
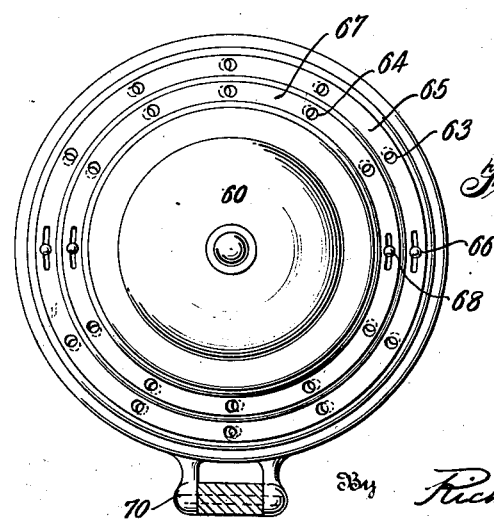
Inventor
Michael Felix
By Richard K. Stevens
Attorney

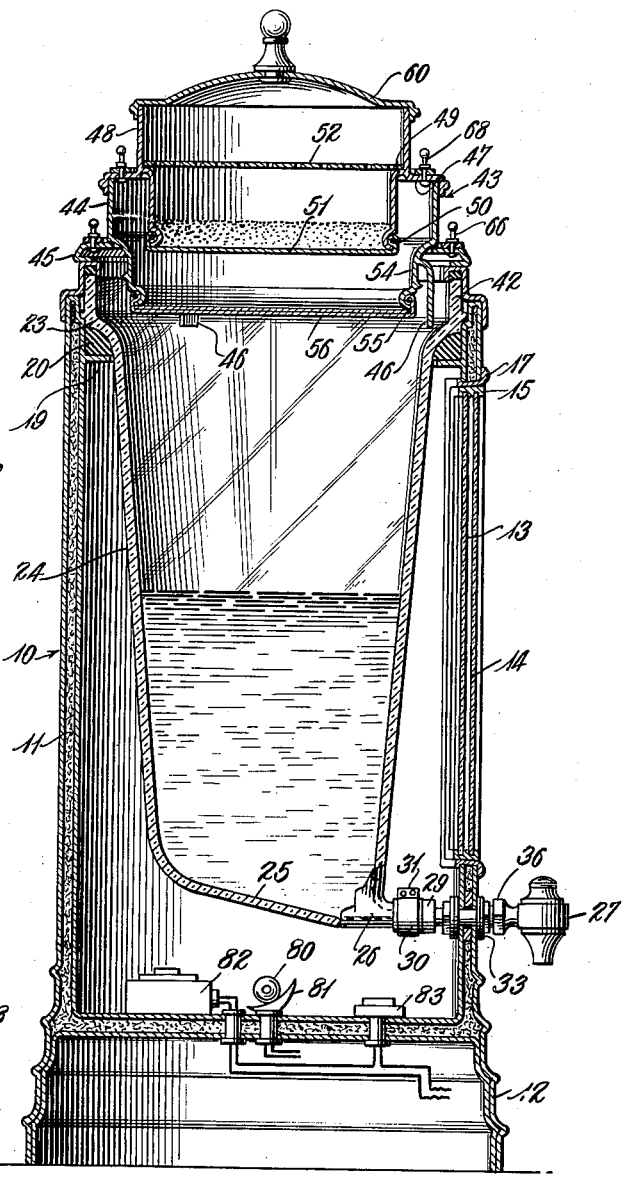

Patented Oct. 26, 1937

2,096,849

UNITED STATES PATENT OFFICE 2,096,849

APPARATUS FOR PREPARING INFUSIONS

Michael Felix, Flushing, N. Y.

Application February 4, 1937, Serial No. 124,095

7 Claims. (Cl. 53—3)

This invention relates to the art of preparing beverage infusions, and specifically it relates to coffee urn constructions and a method of preparing infusions.

Beverage coffee for years has been one of the most popular beverages particularly suited for consumption at meal-time, but during recent years considerable study has been given to beverage coffee since it has been determined by physicians and scientists that such beverage unless prepared from ground coffee in proper condition and prepared by certain recognized procedure, does contain substances which are injurious when consumed in substantial and regular amounts.

It has been proven by authoritative analysis that beverage coffee, when improperly prepared, contains numerous types of chemical substances among which are caffein, tannic acid, nitrogenous substances, dextrin, crude fiber, petroleum, and other extracts. A report covering such an investigation of coffee has been published by Brazilian-American Coffee Promotion Committee, the report having been prepared by Samuel C. Prescott, S. B., Sc. D., Professor of Industrial Microbiology and Director, Department of Biology and Public Health, Massachusetts Institute of Technology.

The above referred to report indicates that extended inquiry led to the belief that the method of preparing a beverage coffee is of greater significance from the standpoint of physiological effect upon the consumer than has commonly been believed and that the factors necessary to be considered in the preparation of coffee involve the coffee itself, that is its freshness, degree of roast and fineness of grind, the character of the water, the temperature of the water, the character of the container used in the infusing, the infusion time, the strength of infusion, and the effect of the addition of other substances.

The present application is a continuation in part of my application Serial Number 726,779, filed May 21, 1934.

It is an object of the present invention to overcome the difficulties heretofore encountered in the preparation of infusions, this invention contemplating the provision of an apparatus in which such infusions may be prepared in a condition free of those injurious constituents present in infusions as usually prepared.

An additional object of this invention is the provision of an urn in which the coffee or other infusion after being prepared is maintained in a heated condition below the boiling point of water, and in which the coffee and the water to be employed in the making of the infusion, after being heated, are both maintained out of contact with metallic surfaces.

It is an additional object of this invention to provide a glass beverage container within an enclosed air space which may be heated if desired, and from which the glass container may be readily removed when replacement thereof becomes necessary or desirable.

The invention still further contemplates the provision of an urn for preparing coffee and the like having an outer receptacle containing air and an inner transparent receptacle for the beverage, with a sight glass arranged in the wall of the outer receptacle through which the quantity of infusion in the beverage receptacle may be observed.

It is a further object of this invention to provide an urn for coffee infusions and the like in which the infusion is displayed in such pleasing manner while being completely protected that the display provides sales stimulation.

It is also contemplated by this invention to provide an urn having a ground coffee holder in which the coffee is maintained upon a filter cloth in a loose condition so as to permit the ready passage of heated water therethrough, the holder being capable of being removed from the remainder of the urn and maintained so that the filter cloth is immersed in water thus avoiding drying and concentration of coffee infusion within the filter cloth. As distinguished from this procedure, if the filter cloths were permitted to dry between brewing operations, objectionable odor is derived therefrom and exists in the beverage thereafter brewed.

Other objects and advantages will be apparent from the following detailed description when considered in connection with the accompanying drawings wherein:

Fig. 1 is an elevational view of a coffee urn made in accordance with the present invention;

Fig. 2 is a vertical sectional view taken on line 2—2 of Fig. 1;

Fig. 3 is an elevational view of the coffee holder with the filter assembly partly in section removed from the urn and positioned on a support in a manner in which the filter cloths are maintained immersed in water;

Fig. 4 is a top plan view of the urn with the outer cover removed;

Fig. 5 is a detailed sectional view of the draw-off cock;

Fig. 6 is a sectional view of the cover of the urn, and

Fig. 7 is a transverse sectional view of the draw-off cock.

Now in referring to the drawings in detail, the numeral 10 designates an outer receptacle having an insulated double wall 11 formed with an extension 12 below the bottom of the receptacle, which provides a support for the receptacle.

A double sight glass 13 enclosing a dead air space 14 is arranged in the wall of the receptacle 10, and it is preferably mounted in a frame 15 which is attached to the receptacle 10 by means of hinges 16. In the specific construction illustrated, the outer wall of the receptacle 10 is struck inwardly to form a flange 17 against which the hinged frame 15 seats. A catch, with operating knob 18 is provided to secure the frame 15 in closed position. When the frame is swung outward on its hinges, the space then existing in the wall of the receptacle provides a hand opening for the purpose to be hereinafter discussed.

An inwardly extending flange 19 is spaced a short distance below the upper end of the receptacle to support an annular ring of resilient packing 20 upon which is positioned a shoulder 23 of an inner container 24 and this container is preferably constructed of non-expansible or "oven" glass. Container 24 tapers in a downward direction and has a slanting bottom 25 and a tubular extension 26. Extension 26 is connected to a cock 27 by means of a porcelain lined connecting pipe 28. The extension 26 has a smooth exterior, and a casting 29 is adapted to be secured thereto by means of a split sleeve 30 which is adapted to be compressed by a contractible band 31. Packing elements 32 are provided at this joint to render the same water-tight. Casting 29 is internally screwthreaded and the exteriorly threaded pipe 28 is screwed therein with the interior of the pipe being of the same diameter as the interior of the extension 26. Packing nuts 33 are mounted on the pipe 28 on each side of the wall 11 and packing members 34 are arranged between the respective packing nuts 33 and the wall. That portion of the wall 11 about the connecting pipe 28 is solid metal as contrasted with the remainder of the wall, which is filled between the double walls with an insulating material. Cock 27 has a watertight ground joint connection 35 with the pipe 28, and a draw-up nut 36 is utilized to maintain the connection. The cock is preferably provided with a rotary hollow plug 37 having a longitudinal bore 38 and a lateral port 39, which port is adapted to be moved so as to establish a communication between the bore 38 and the interior of the pipe 28 upon movement of the handle 40. Each of the metallic parts of the cock 27 and pipe 28, which are normally subject to contact with the beverage while in storage or as it is drawn from the container 24, is porcelain lined as indicated at 41. A porcelain lined depression 85 in the face of plug 37 is designed to move into position closing the end of pipe 28 when the draw-off cock is in closed position.

The upper portion of the container 24 is enlarged as at 42 and it is constructed sufficiently strong to support the coffee infusion mechanism upon the rim thereof. This coffee infusion mechanism is indicated generally at 43 and it may be constructed either of glass or metal, but if constructed of metal the metallic parts which are contacted by the liquid or vapors should be coated with porcelain enamel. Furthermore, the contacting parts of the portion 42 and the infusion mechanism are protected by porcelain enameled metal clamped over a gasket of rubber or similar material.

The infusion device 43 has an outer casing 44 and a circumferential flange 45, which flange engages upon the rim of the container 24. The flange is turned downwardly at its edge so that after being engaged upon the rim, accidental displacement of the infusion device is substantially avoided and the infusion device is properly aligned with the lower portion thereof extending into the container 24. The casing 44 is provided with legs 46 which are adapted to be used for supporting the infusion device when the same is placed on a counter or other support as indicated in Fig. 3. The upper portion of the casing 44 supports an inner container 48 by engaging the flange 47, which is formed integral with the container 48. A downwardly extending lip on flange 47 engages the edge of casing 44 and prevents accidental displacement of the container when the infusion mechanism is in operative position. Container 48 is provided at its bottom with an annular bead 50 over which a muslin or other suitable filter cloth 51 is stretched by means of the customary drawstring. It is upon this filter cloth 51 that the ground coffee is loosely held. The coffee is thus permitted to float freely within the container 48 as water is poured thereon, but the floating of the coffee is restricted by the reticulated plate 52. Plate 52 also acts to distribute the water over the entire surface of the coffee as distinguished from delivering it to the coffee in a single stream. This plate 52 is supported upon the inwardly extending shoulder 49.

At the lower end of the casing 44 and inwardly of its legs 46, the casing is reduced in diameter as indicated at 54. An annular bead 55 is arranged on the extreme end of the reduced portion 54 and a cotton filter cloth 56, preferably of the type having an upper fluffy or fibrous surface and a lower normal woven surface, is secured thereon by the customary drawstring.

As shown in Fig. 3 a cap or closure member 57 is adapted to be screwed over the lower filter cloth 56, and the cap 57 is provided with a thread 58 which engages with thread 59 arranged on the exterior of the reduced portion 54 of the casing 44 so that when the infusion device is removed from the remainder of the urn, washed and cleaned, the cap 57 may be secured in position and the infusion device filled with water to a level above both filter cloths 51 and 56 so that these filter cloths can be maintained in a moist condition when the infusion device is not being utilized.

A cover 60 is formed to fit over the upper edge of the casing 44 and this cover may have a downwardly extending lip about the edge thereof to engage the top of container 48.

Vents 63 and 64 respectively arranged in flange 45 and flange 47 permit the escape of vapors from the inner container 24 and from the interior of the infusion device. Vents 63 are adapted to be closed or opened at will by an annular valve plate 65 which is formed with openings adapted to be registered with the vents 63 or to be moved out of registry, therewith by means of knobs 66 secured to the plate 65. An annular valve plate 67 of similar construction having knobs 68 operates to open and close vents 64.

In Fig. 1, a cover 69 is secured to the receptacle 10 by means of a hinge 70 and fitted with a catch 71 which engages a projection 72 mounted on receptacle 10 to retain the cover in closed position.

Referring now to Fig. 6, the cover 69 consists of an outer shell 73 and an inner shell 74 movable with respect to shell 73. An annular depressed portion 75 of the shell 74 is adapted to contact the upper portion of the container 24, leaving a downwardly extending lip 76 which moves in an annular trough 77 secured to the edge of shell 73 by rivets, bolts or any other known means. The lip 76 cooperates with trough 77 to limit the motion of shell 74 relative to shell 73. The action of springs 78 is to maintain the tight contact between the upper edge of container 24 and the depressed portion of shell 74. A metal ferrule 79 covers the upper ends of and joint between receptacle 10 and container 24. Insulation of a loose nature preferably fills the space between shells 73 and 74. A pair of concentric pipes indicated at 84 provides for equalization of the pressure within container 24 with atmospheric pressure to permit withdrawal of the beverage.

A source of light, such as electric bulb 80, is placed at the bottom of the interior of receptacle 10 for the purpose of permitting better view of the beverage in container 24 through sight glass 13. The light may be equipped with a reflector 81 for the purpose of directing the light to a desired area within the receptacle. An electrical resistance heater 82 of conventional structure is also positioned on the bottom of receptacle 10, together with a thermostatic control therefor designated 83.

Access to the drainage connections leading from the container 24 to the cock 27 and also to the lighting and heating means on the bottom of the receptacle 10 is provided by opening of the door comprising frame 15 and sight glass 13.

In preparing coffee beverage in accordance with the present invention, modifications of the above described apparatus may be employed, but the method will be set forth specifically in connection with the herein disclosed equipment.

Cap 57 is removed from the bottom of the infusion mechanism and the water is drained therefrom and after the cover 60 and the plate 52 are removed, ground coffee is placed in a loose condition upon the filter cloth 51. This mechanism is then positioned with its flange 45 resting upon the rim of the portion 42 of the coffee container 24 after the cover 69 has been removed to a position shown in Fig. 1. Hot water just below the boiling point is then poured into the infusion mechanism upon the plate 52 which has now been placed in position as shown in Fig. 2 and the water passes readily through the ground coffee and first through the filter cloth 56 which is of a character capable of retaining even fine foreign particles so that the coffee as it is passed through the receptacle 24 is of a clear nature. As the water passes through the infusion device the temperature drops slightly so that the coffee being treated is subjected to a temperature substantially below that of boiling water. It has been found that approximately two pounds of ground coffee is sufficient to produce four to five gallons of beverage coffee and, due to the construction of the infusion mechanism, the coffee is permitted to be in a sufficiently non-compacted condition as the water is passed through so that the bulk of the water in passing through the coffee is not in contact therewith for a period exceeding approximately two minutes.

Due to the arrangement of the controlled vents 63 and 64, the escape of vapors and air is permitted both from the compartment in which the beverage flows after its passage through the filter cloth 51 and from the space within the receptacle 24. These vents provide for the relief of pressure whereby the water is permitted to pass quickly through the ground coffee. By adjustment of the vent openings, the rate at which the pressure in the inner container is released may be determined so as to control the flow of water through the coffee and consequently the time of infusion.

It has been established by research that the best coffee beverage from the standpoint of flavor and aroma as well as lack of harmful ingredients is prepared by maintaining ground coffee in contact with water below the boiling point thereof for a period of approximately two minutes. This method of preparing the infusion may be followed in connection with the present infusion device by the proper manipulation of the vents 63 and 64.

The coffee beverage in the container 24 immediately after making the same in the manner described will be of a temperature of about 185° F. The present construction, due to the insulation between the double walls of the receptacle and the air space between container 24 and receptacle 10, will maintain the temperature of the beverage above 175° F. for a period of about two hours under normal conditions of use. In the event that the beverage is not used within the two hour period, the temperature of the air space between container 24 and receptacle 10 may drop below 175° F. before the coffee beverage reaches that temperature. When the air space drops to 175° F., the thermostatic control 83 automatically closes the circuit supplying the electrical resistance 82, causing the air space to be heated to about 185° F., at which point the circuit will be again opened automatically by the action of the thermostatic control. The coffee beverage is thereby maintained within the temperature range 175° F. to 185° F., which has been found to be the most satisfactory as being below the temperature at which the beverage will deteriorate during the time of storage, but hot enough to make for maximum enjoyment of the beverage by the consumer.

The transparent nature of the container 24 together with the glass view plate 13 permit the operator to ascertain the quantity of coffee beverage in the container at any time. The source of light 80 and the reflector 81 are so placed that light is thrown against the interior of the wall of receptacle 10 over an area opposite the view plate 13. This light is reflected through the transparent container 24, allowing clear view of the height of the contents thereof. The operator is thereby enabled to keep a sufficient supply of coffee beverage on hand by preparing a fresh supply of the infusion whenever the level in container 24 becomes too low to be regarded as an adequate supply. The interior surface of receptacle 10 is preferably of polished metal or porcelain enamel of a color distinct from the color of the infusion intended to be prepared in the apparatus.

The beverage within the container 24 is only indirectly heated and it is free of contact with any metal parts so that the beverage as drawn through cock 27 is of a high quality and is free of objectionable chemical ingredients. Additionally the coffee is free of objectionable ingredients such as result from boiling or subjection to high temperature steam as well as from a long period infusion operation.

After the beverage coffee has been produced in the receptacle 24 the infusion mechanism is removed from its operative position and the coffee grounds are removed therefrom. The cap 57 is then secured into position and water is placed in the infusion mechanism so as to immerse both filter cloths.

The cover 69 is placed back in position after the removal of the infusion device and the quantity of coffee existent within the receptacle 24 can be readily ascertained by viewing the same through the glass 13 and transparent container 24 in the manner described above.

Cloth is used as the filter in the present operation instead of paper or other substances because of its freedom from readily decomposable chemical elements which would be carried into the beverage. Moreover, the cloth allows the coffee beverage to filter through the coffee grounds within the time specified by scientific research in order to extract only the valuable substances of the coffee bean.

The present construction results in reduction of fire hazard and elimination of danger of overheating of the coffee beverage by dispensing with the gas flame heretofore used to maintain the temperature of large quantities of beverage. By simplification of the structure as compared with known urns used prior to this invention breakage losses and difficulties in cleaning are overcome. It is to be noted that glass gauges and gauge faucets are not required, leaving surfaces easily accessible without projections that may be broken or injure the hands of the person cleaning the same. There is also provided a good view of the contents of the urn and the method of preparation of the beverage insures a clear rich colored liquid, enhancing the sales appeal.

What I claim is:

1. An infusion mechanism for use in urns comprising a casing and a plurality of filter cloths, said filter cloths being arranged in spaced relation within the casing, said casing being formed to receive a coffee supply upon the upper filter and to permit the passage of water poured upon the coffee to pass through the coffee and the infusion thus formed to pass through the upper filter cloth then through the lower filter cloth and out of the casing, and a closure cap for the bottom of the casing arranged to prevent the passage of liquid through the casing so that water may be maintained in the casing with the filter cloths immersed therein during the period between infusion operations.

2. An infusion mechanism for use in urns comprising separable sections each having a filter cloth arranged therein, said sections being arranged with the filter cloths one above the other when in operation and with the upper filter cloth capable of holding a coffee supply thereon, a cover for the mechanism adapted to be removed so that water can be poured upon the coffee and the infusion thus formed will pass through the upper filter cloth while the larger foreign particles are retained thereon, said lower filter cloth having its upper surface formed with a fine nap whereby as the infusion is passed to and through the same from the upper filter cloth finely dispersed foreign matter will be retained on the lower filter cloth and a high quality beverage will be discharged from the mechanism, and a closure cap for the bottom of the mechanism arranged to prevent the passage of liquid through the mechanism when desired so that water may be maintained in the mechanism with the filter cloths immersed therein during the period between infusion operations.

3. An infusion mechanism for use in urns comprising separable casing sections adapted to partially telescope, each of said casing having a filter cloth tied over a bead formed on the extreme lower end thereof so that when the sections are in operative position the filter cloths are positioned one above the other with the upper filter cloth being arranged to receive a coffee supply thereon, the construction being such that water can be poured upon the coffee and the infusion thus formed will pass through the upper filter cloth while the larger foreign particles are retained thereon, said lower filter cloth having its upper surface formed with a fine nap whereby as the infusion is passed to and through the same from the upper filter cloth finely dispersed foreign matter will be retained on the lower filter cloth and a high quality beverage will be discharged from the mechanism.

4. An infusion mechanism for use in urns comprising separable sections each having a filter cloth therein, said sections being arranged with the filter cloths one above the other when in operative position, and a closure for the bottom of the lower section arranged to prevent the passage of liquid through the casing when desired so that water may be maintained in the section with the filter cloths immersed therein during the period between infusion operations.

5. An infusion mechanism comprising an outer shell having a flange provided with a series of openings and an annular ring having corresponding openings, said ring being movable around said outer shell to permit the closing or registry of the series of openings at will, another shell supported within the outer shell having its wall spaced from the wall of the outer shell and a valve controlled opening in the outer shell above the flange affording venting means to the atmosphere for the space between the inner and outer shells, each of said shells having a filter at its lower end which when the sections are assembled are positioned one above the other.

6. An infusion mechanism comprising inner and outer spaced telescoped shells, the inner shell being provided with a flange at its upper portion engaging upon an internal flange in the outer shell for supporting the same and forming a tight connection between the two shells, an external flange on the outer shell adapted to constitute a support for the entire mechanism when placed in an urn, said external flange having a valve controlled opening therethrough, the outer shell being provided with a valve controlled opening above the flange affording a vent to the atmosphere for the space between the shells, a filter cloth at the bottom of the inner shell adapted to retain ground coffee for the preparation of an infusion, a reduced portion on the outer shell at the bottom thereof having a filter cloth secured thereon, and legs surrounding the reduced portion extending below the filter cloth on the outer shell.

7. An infusion mechanism for use with urns of the class described comprising a normally upright annular casing having an open top and bottom, a plurality of filter cloths extending transversely across the casing and located in spaced relation so as to provide a plurality of superposed compartments within the casing and a closure cap detachably mounted in liquid tight engagement upon the bottom of the casing.

MICHAEL FELIX.